US009593944B2

(12) United States Patent
Jung

(10) Patent No.: US 9,593,944 B2
(45) Date of Patent: Mar. 14, 2017

(54) METHOD FOR CALCULATING SHAPE OF PAINTING SPRAY HEAD

(71) Applicant: Hyundai Motor Company, Seoul (KR)

(72) Inventor: Jae Hoon Jung, Ulsan (KR)

(73) Assignee: Hyundai Motor Company, Seoul (KR)

( * ) Notice: Subject to any disclaimer, the term of this patent is extended or adjusted under 35 U.S.C. 154(b) by 111 days.

(21) Appl. No.: 14/444,466

(22) Filed: Jul. 28, 2014

(65) Prior Publication Data

US 2015/0247725 A1 Sep. 3, 2015

(30) Foreign Application Priority Data

Mar. 3, 2014 (KR) ........................ 10-2014-0025199

(51) Int. Cl.
*G01B 21/20* (2006.01)
*B05B 9/01* (2006.01)
*B05B 3/10* (2006.01)

(52) U.S. Cl.
CPC ............ *G01B 21/20* (2013.01); *B05B 3/1007* (2013.01); *B05B 9/01* (2013.01); *Y10T 29/49002* (2015.01)

(58) Field of Classification Search
CPC ........... G01B 21/20; B05B 9/01; G06F 17/50; B05V 1/02; B05V 1/202
USPC .......................................................... 702/167
See application file for complete search history.

(56) References Cited

U.S. PATENT DOCUMENTS

2010/0121620 A1* 5/2010 Schick .................... B05B 12/00 703/2
2010/0155504 A1* 6/2010 Yamasaki ............. B05B 3/1014 239/214

FOREIGN PATENT DOCUMENTS

| | | | |
|---|---|---|---|
| JP | 08-155344 | A | 6/1996 |
| JP | 11-073438 | A | 3/1999 |
| JP | 2007100212 | A * | 4/2007 |
| JP | 2009-226602 | A | 10/2009 |
| KR | 10-2002-0090410 | A | 12/2002 |

OTHER PUBLICATIONS

Machine Translation JP11-073438; Iwamoto et al;.*
Machine Translation JP2007-100212; Muramatsu et al.*
Machine Translation JP2002-168163; Okamoto et al.*
Machine Translation JP2009-226602; Onozawa.*

* cited by examiner

*Primary Examiner* — Gregory J Toatley
*Assistant Examiner* — Terence Stifter, Jr.
(74) *Attorney, Agent, or Firm* — Mintz Levin Cohn Ferris Glovsky and Popeo, P.C.; Peter F. Corless

(57) ABSTRACT

A method for calculating a shape of a painting spray head that injects liquid paint supplied to the center in a radial direction while rotating, includes: inputting a material characteristic of painting liquid to be injected; selecting a start point where a curve starts on a front surface of the painting spray head; calculating the thickness of a liquid film injected from the painting spray head through an input numerical value; correcting the start point where the curve starts depending on a difference value between the calculated thickness of the liquid film and a required thickness of the liquid film; and calculating a curve shape of the painting spray head by using the corrected start point.

7 Claims, 15 Drawing Sheets

METHOD FOR CALCULATING SHAPE OF PAINTING SPRAY HEAD

CROSS-REFERENCE TO RELATED APPLICATION

This application claims under 35 U.S.C. §119(a) priority to and the benefit of Korean Patent Application No. 10-2014-0025199 filed in the Korean Intellectual Property Office on Mar. 3, 2014, the entire contents of which are incorporated herein by reference.

BACKGROUND (a) Field of the Invention

The present invention relates to a shape calculation method of a spray head for painting which uniformly sprays paint onto the surface of a vehicle body and uniformly forms a painted surface to improve aesthetic characteristics of a vehicle body and maintain durability.

(b) Description of the Related Art

A technology using atomization of a liquid provides various benefits, e.g., the technology of a sprayer that sprays the liquid as very small particles can be used in different parts for various industries.

As a representative example, an atomization technology of the liquid is used as a primary technology in a fuel injection process and a painting process. As compared to other technologies, a rotary spraying method is advantageous in that fuel is sprayed by centrifugal force of a rotary shaft, and as a result, a device is stable while a load of the device is less subject to injection pressure, and a system structure is simple and allows for miniaturization. The advantage of the rotary fuel injection method provides the same advantageous method even in the case of painting.

An atomizer refers to a device that atomizes liquid to circularly spray the atomized liquid in a spray pattern and is rotated at high speed. The atomizer has an advantage in that all paint materials may be applied to the atomizer, and such a device is suitable for an environment requiring large-scale painting such as continuous vehicle painting and thus is continuously performed.

According to an injection principle, liquid painting is supplied to the center of a rotated disk to be dispersed and sprayed around by centrifugal force of the disk. In particular, when a rotational velocity and a liquid flow rate are controlled, a desired thickness of a liquid film may be obtained.

A bell cup may be fixed to the rotary shaft in a cone shape or a disk shape having a curve, and the paint is supplied to a back surface of the disk and thereafter, is spread outside the disk as a thin film by the centrifugal force of the disk that rotates at high speed.

In this case, the moment when the liquid deviates from the disk, the liquid is atomized by compressed air of a nozzle at an edge of the disk. A design of the spray head surface until the liquid is injected is the most important part in performance of the bell cup.

According to the design, painting quality is determined by the size of a liquid drop, and the size and the uniformity of the liquid drop depend on quality of a paint thin film formed on the surface of the bell cup by the centrifugal force.

The edge may have a plane shape, a single sawtooth shape, or a cross sawtooth shape according to a spray head shape. The spray head is used for various paints, and as a result, various models and transformed products are required to satisfy requirements of performance and quality.

Important elements to determine the required models or transformed products are a diameter of the spray head, a disk material, an operation RPM, and an angle of a spray head surface.

The above information disclosed in this Background section is only for enhancement of understanding of the background of the invention and therefore it may contain information that does not form the prior art that is already known in this country to a person of ordinary skill in the art.

SUMMARY

The present invention provides a shape calculation method of a spray head for painting that uniformly sprays paint onto the surface of a vehicle body and uniformly forms a painted surface in an enhanced shape to improve aesthetic characteristics of a vehicle body and maintain durability.

An exemplary embodiment of the present invention provides a method for deriving a shape of a painting spray head that injects liquid paint supplied to the center in a radial direction while rotating, including: inputting a material characteristic of painting liquid to be injected; selecting a start point where a curve starts on a front surface of the painting spray head; calculating the thickness of a liquid film injected from the painting spray head through an input numerical value; correcting the start point where the curve starts depending on a difference value between the calculated thickness of the liquid film and a required thickness of the liquid film; and calculating a curve shape of the painting spray head by using the corrected start point.

The method may further include inputting an rpm of the painting spray head.

The material characteristic may include density and viscosity.

The method may further include selecting an injection flow rate of the painting liquid.

The start point may is a linear distance measured toward an edge from the center of the painting spray head.

Another exemplary embodiment of the present invention provides a painting spray head which is manufactured by the method for calculating a shape of a painting spray head; a painting liquid supplying unit which supplies painting liquid to the spray head; a compressed air supplying unit which supplies compressed air to the spray head to inject the painting liquid together with the compressed air; and a moving unit which moves the painting spray head along a set route of a set space.

A non-transitory computer readable medium containing program instructions executed by a processor on a controller may include: program instructions that input a material characteristic of painting liquid to be injected; program instructions that select a start point where a curve starts on a front surface of a painting spray head; program instructions that calculate the thickness of a liquid film injected from the painting spray head through an input numerical value; program instructions that correct the start point where the curve starts depending on a difference value between the calculated thickness of the liquid film and a required thickness of the liquid film; and program instructions that calculate a curve shape of the painting spray head by using the corrected start point.

According to an exemplary embodiment of the present invention, paint is uniformly sprayed onto the surface of a vehicle body and a painted surface is uniformly formed in a more enhanced shape to improve aesthetic characteristics of a vehicle body and maintain improved durability.

DETAILED DESCRIPTION OF THE EMBODIMENTS

An exemplary embodiment of the present invention will hereinafter be described in detail with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Figure 1:
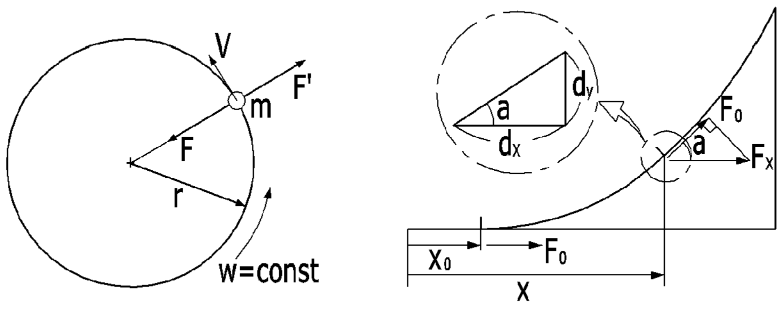
FIG. 1 illustrates the relationship of force in a spray head for painting according to an exemplary embodiment of the present invention.

FIG. 1 illustrates the relationship of force in a spray head for painting according to an exemplary embodiment of the present invention.

Referring to FIG. 1, when an object rotates, centripetal force toward a circle center is generated according to a rotation radius r, an angular velocity w, and a mass m.

The centripetal force is force which is the same as tension with which a thread is pulled at the center so as to keep a predetermined rotary radius when the object is tied to the thread. In addition, force to make the object spring force by rotation is also generated, and the force is called centrifugal force.

The centripetal force and the centrifugal force are simultaneously generated and when the centripetal force and the centrifugal force have the same magnitude as each other, the object may be rotated with a predetermined radius. In this case, a relationship to acquire the force is $$F = F' = \frac{mv^2}{r} = mrw^2.$$

In particular, when there is no medium that holds the object, only the centrifugal force is applied and the object moves in a radial direction with acceleration.

It is assumed that predetermined force is applied from a radius $x_0$ designed in FIG. 1 based on a given condition (m=0.1 kg, rpm=25,000 rev/min, x>0 cm) in order to design the surface of the spray head.

The surface is changed to the curve from $x_0$ in order to apply the predetermined force from the designated radius $x_0$. In this case, when the force at the radius $x_0$ is $F_0$, a component of tangent force for an entire curve is assumed as the predetermined force, and as a result, the tangent force is set to $F_0$.

Further, when radial force for x over the radius $x_0$ based on a horizontal surface is $F_0$, a curve tangent angle a of point x based on horizontality may be acquired through the relationship between $F_0$ and $F_x$.

The relationship of a micro rise height dy for a micro-distance dx is considered with respect to: which is an entire radius using the curve tangent angle, two surface functions illustrated below may be acquired.

$$(0 < x_0 \leq 1)\ y = \frac{x\sqrt{1-\left(\frac{x_0}{x}\right)^2}\left[x\sqrt{x^2-x_0^2} - x_0^2\left\{\ln\left(x+\sqrt{x^2-x_0^2}\right)\right\}\right]}{2x_0\sqrt{x^2-x_0^2}}$$

$$(x_0 > 1)\ y' = y + |y(x_0)|$$

In particular, since a particle need not be located at an origin in order to receive centrifugal force, $x_0>0$ needs to be established. In summary, in the case of the flow of the particle that follows two surface functions, the particle flows along the surface while receiving the same force as the force at the point where the curve is started and acceleration.

Figure 2:
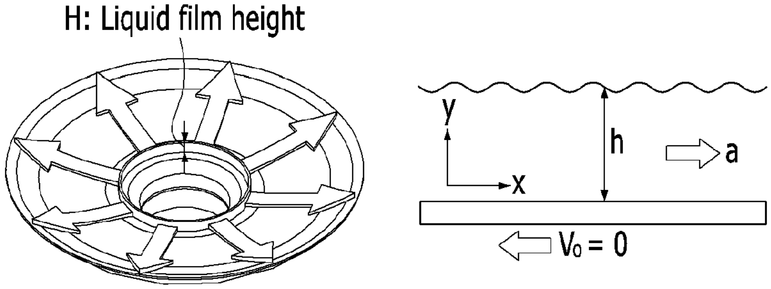
FIG. 2 illustrates liquid analysis of analyzing a forming height of a liquid film in the spray head according to the exemplary embodiment of the present invention.

FIG. 2 illustrates liquid analysis of analyzing a forming height of a liquid film in the spray head according to the exemplary embodiment of the present invention.

In FIG. 2, when it is assumed that paint is sprayed in the form of a thin film along the surface of the spray head by the centrifugal force, a cross-section of the flow may be analyzed as Couette flow having a free boundary surface as illustrated in FIG. 2 and it may be described that the paint has a predetermined acceleration by receiving a predetermined force on the curve.

Since a velocity component of the flow is present only in an x direction (u component), $$\frac{\delta u}{\delta x} = O$$

in a continuity equation and when the flow is regarded as a normal flow, u=u(y). In particular, when a Navier-Stockes equation is used, there is no acceleration of v and y and acceleration of w and z, and as a result, there is no pressure change of a y-z plane.

Since pressure on a film surface y=h is atmospheric pressure and pressure of an entire film is also atmospheric pressure (gauge pressure of 0), $$a = -\frac{\mu}{\rho}\left(\frac{\delta^2 u}{\delta y^2}\right)$$

is shown as x-direction acceleration. When y is integrated and air resistance is disregarded at y=h, shear stress on the film surface is $$\tau_{yx} = \mu\left(\frac{\delta u}{\delta y}\right),$$

and as a result, an integral constant may be acquired as $$C_1 = \frac{\rho a h}{\mu}.$$

By integrating y once more and substituting $C_1$, a velocity distribution is shown as $$u = -\frac{\rho a}{2u}y^2 + \frac{\rho a h}{u}y$$

because u=0 when y=0. When the velocity distribution is integrated as large as h and a width b is calculated, a total flow rate is calculated by $$q = \frac{\rho a h^3 b}{3\mu}$$

and the thickness of the thin film is calculated by $$h = \sqrt[3]{\frac{3q\mu}{\rho a b}}.$$

Herein, h represents the thickness of the liquid film, q represents a flow rate (cc), and μ ($N*s/M^2$) and ρ ($km/m^2$) represent a material characteristic of painting liquid, $$a = -\frac{\mu}{\rho}\left(\frac{\partial^2 u}{\partial y^2}\right),$$

and in addition, referring to FIG. 1, b=2πx and b increases according to x.

Accordingly, an average flow rate q is Vhb and herein, an average velocity is $$V = \frac{\rho a h^3}{3\mu}.$$

A non-dimensional equation for the velocity distribution is $$\frac{u}{V} = -C\left(\frac{y}{h}\right)^2 + 2C\left(\frac{y}{h}\right)$$

and a non-dimensional coefficient is $$C = \frac{\rho a h^2}{2\mu V}.$$

Figure 3:
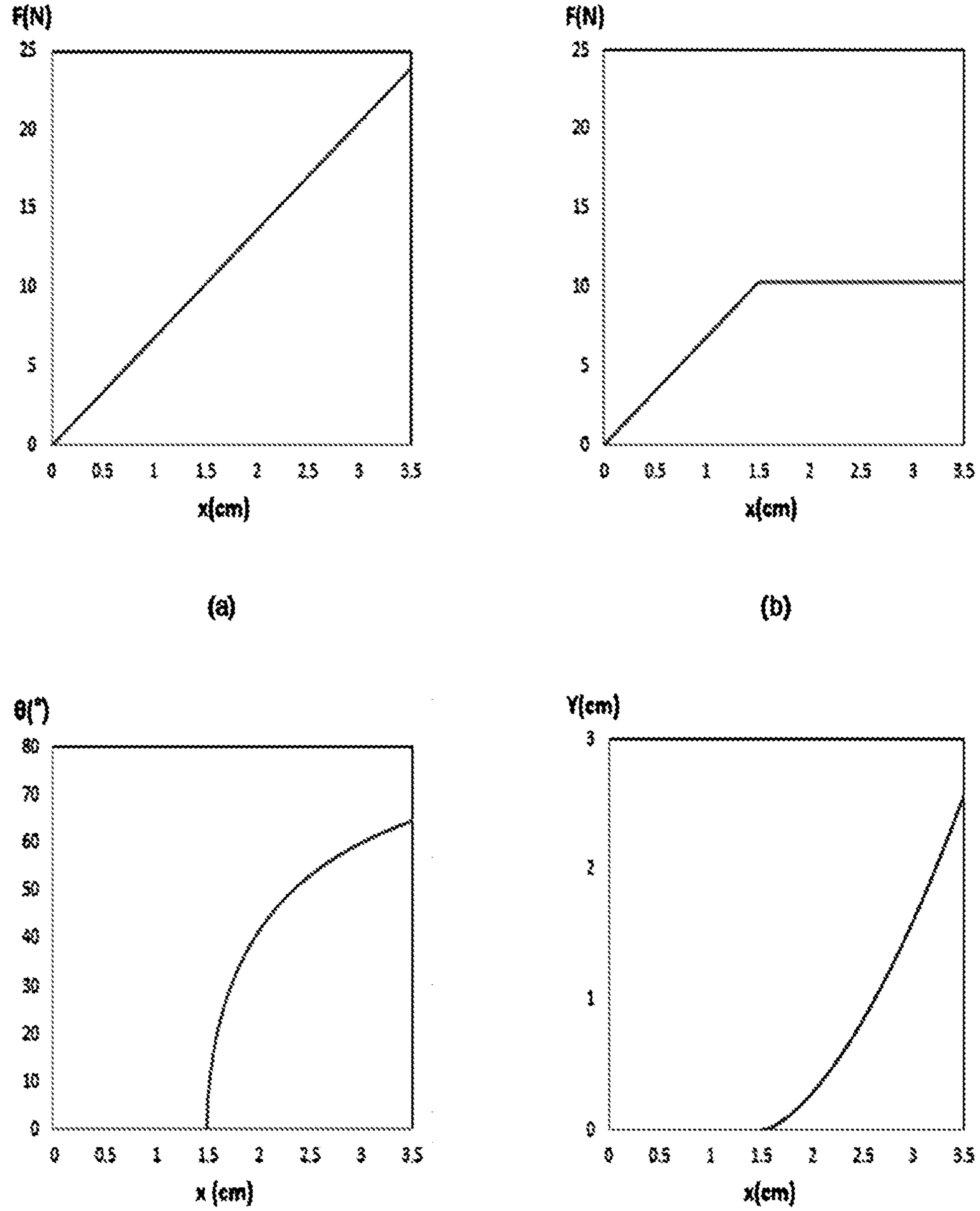
FIG. 3 illustrates (a) force when there is no curve in the spray head, (b) force when a curve is formed at x0=1.5 cm, (c) a tangent rise angle at x0=1.5 cm, and (d) an actual profile (1:1) at x0=1.5 cm according to the exemplary embodiment of the present invention.

FIG. 3 illustrates (a) force when there is no curve in the spray head, (b) force when a curve is formed at x0=1.5 cm, (c) a tangent rise angle at x0=1.5 cm, and (d) an actual profile (1:1) at x0=1.5 cm according to the exemplary embodiment of the present invention.

Modeling the surface by dynamical analysis is shown through a detailed graph. A material used for the analysis is SAE 30 oil which is used as vehicular lubricating oil and a rotational velocity or a flow rate are preset to table values.

In the case where a rotary radius increases from an original point when the paint rotates constantly at 25,000 rpm, it can be seen that the centrifugal force increases proportionally through FIG. 3(*a*). When the surface is the plane, the graph is illustrated as FIG. 3(*a*), but when the curve is added in order to acquire predetermined force, a form of the graph is shown as a graph to keep predetermined force at a specific point (1.5 cm) like FIG. 3(*b*).

The force increases proportionally according to a radius from the original point to the specific point and the force shows a predetermined aspect over the specific point. In order to keep the force constantly, the surface is curved and an angle formed by the tangent of the curve and the plane starts to be shown over the specific point like FIG. 3(*c*).

When the curve is started in an initial stage, the angle increases rapidly and as the radius is larger, a sudden change does not occur, but the angle with the surface is high. The constant force is acquired in FIG. 3(*b*) and the angle of the surface is acquired in order to keep the constant force in FIG. 3(*c*).

The surface is formed as illustrated in FIG. 3(*d*) through the angle of the surface and a flat plate is maintained up to the specific point and thereafter, a curve having a small curvature is formed and as the radius increases, a curve having a large curvature is formed.

Accordingly, it may be determined that liquid that flows along the surface on the same surface as the graph of FIG. 3(*d*) flows while receiving constant force up to the end of the curve from the specific point.

Figure 4:
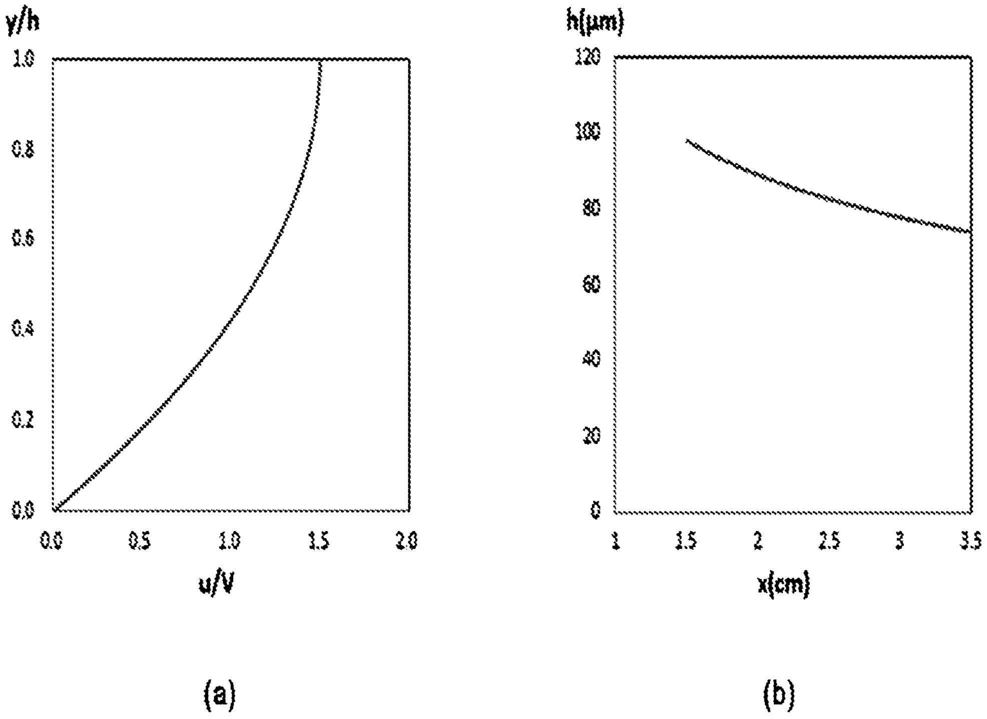
FIG. 4 illustrates (a) a height distribution of a liquid film on a curve surface based on 1.5 cm when (b) a flow rate of a non-dimensional velocity distribution is 440 cc and 25000 rpm when the liquid receives centrifugal force on the surface constantly in the spray head according to the exemplary embodiment of the present invention.

FIG. 4 illustrates a height distribution of a liquid film on a curve surface based on 1.5 cm when (b) a flow rate of a non-dimensional velocity distribution is 440 cc and 25,000 rpm when the liquid receives centrifugal force constantly on the surface in the spray head according to the exemplary embodiment of the present invention.

The flow on the surface determined according to a result of the dynamical analysis is described as the Couette flow of FIG. 2(B) that flows along the curve while receiving the constant force through liquid analysis and the velocity distribution of the material is illustrated in FIG. 4(A) according to the non-dimensional equation.

At the height of the surface and a proximate height, a velocity is shown to be low due to surface friction caused by viscosity of the material. On the contrary, since fiction does not almost affect a liquid film at which is a maximum height of the flow, and as a result, the velocity is shown to be highest. The material flows to the edge of the surface in such a velocity distribution and is attached to the painted material and the quality of painting depends on a particle atomization degree at this end.

In FIG. 2, although the radius becomes larger, the flow rate that flows per cylindrical cross section perpendicular to the surface needs to be maintained constantly. The radius is increased for the flow at the constant flow rate, whereas the height of a cylinder needs to be decreased. FIG. 4(*b*) shows the thickness of the liquid film corresponding to the height of the cylinder from the specific point to the end of the radius and shows a distribution in which the thickness of the liquid film is decreased and the thickness of the liquid film is lowest at the end (x=3.5 cm).

Figure 5:
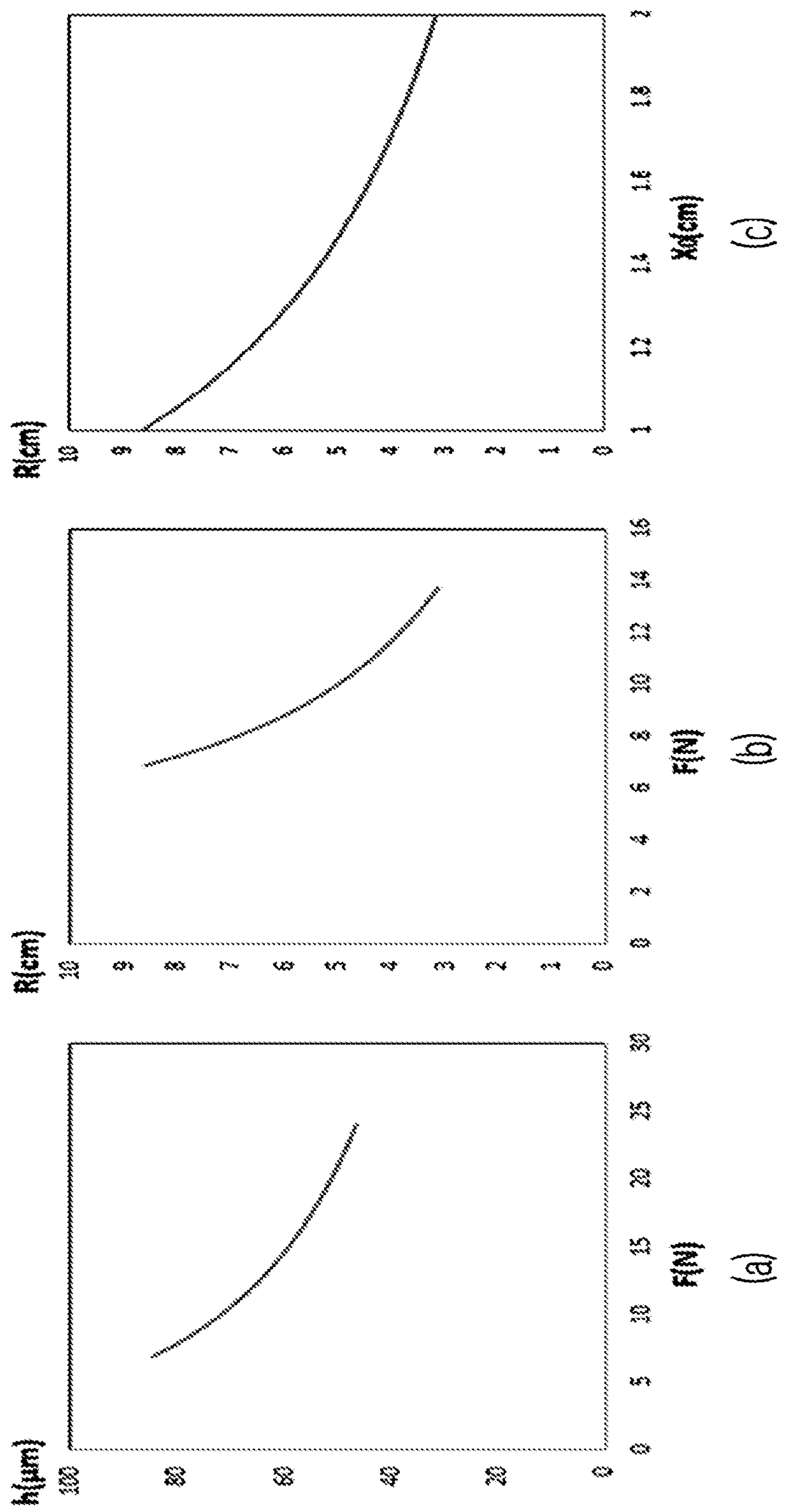
FIG. 5 illustrates (a)-(b) a thin film thickness graph (1.0 to 3.5 cm) depending on a change of constant force and (c) a graph of a radius of an approximate circle depending on constant force (1.0 to 2.0 cm) in the spray head according to the exemplary embodiment of the present invention.

FIG. 5 illustrates (a)-(b) a thin film thickness graph (1.0 to 3.5 cm) depending on a change of constant force and (c) a graph of a radius (1.0 to 2.0 cm) of an approximate circle depending on constant force in the spray head according to the exemplary embodiment of the present invention.

The liquid film needs to keep a constant thickness or less of the liquid film in order to acquire desired painting quality. A desired liquid film height depends on constantly applied force.

In other words, the constantly applied force is different for each specific point separated from the original point and the end calculates the thickness of the final liquid film at the end as the liquid film thickness is gradually decreased as illustrated in FIG. 4(B) according to the force.

An index is illustrated in FIG. 5(*a*)-(*b*), which indicates how large constant force is required to finally acquire the desired liquid film thickness. Heretofore, the description is made by the curve illustrated in FIG. 3(*d*) by using a surface graph in order to maintain the constant force.

However, a theoretical equation for applying the constant force at the specific point is applied in the design, but when an actually designed equation is prepared in the drawing and the curve is actually processed with an NC machine, there are a lot of problems in implementing a complicated equation such as the surface graph. Therefore, the curve is simplified to a circle having a constant radius to be applied to processing.

A method for simplifying the curve is performed by as a method of drawing a circle in which radiuses from three predetermined points to the center are the same by setting three predetermined points of the circle by shaping a cross-section of the surface of the disk two-dimensionally. First, an x value of a first point is a point where the curve separated from the original point is started and a y value is 0.

An x value of a second point is an end point which is a maximum radius and a y value is a value corresponding to an end point in the surface graph. Last, an x value of a third point corresponds to an intermediate value of a first x value and a second x value and a y value is a value acquired by inserting the intermediate x value in the surface graph.

A surface radius proximate to the surface graph is illustrated in FIG. 5(*c*) according to each constant force in an interval having a radius of 1.0 to 2.0 cm. Accordingly, how large force is required to calculate the desired thickness of the liquid film may be known through FIG. 5(*a*)-(*b*) and a radius of curvature requiring the force may be acquired through FIG. 5(*c*).

Figure 6:
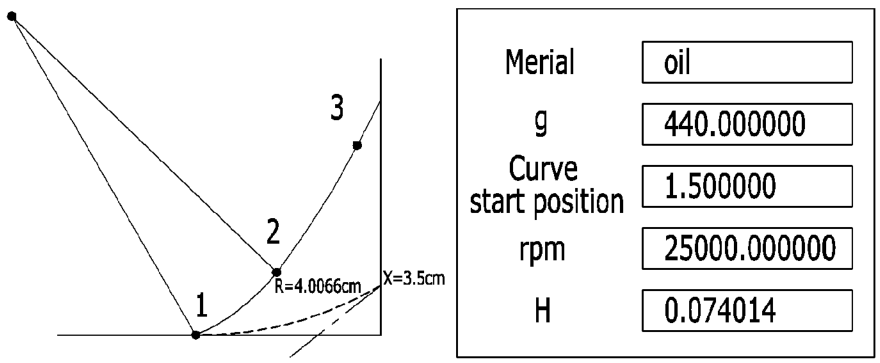
FIG. 6 illustrates a process of making a smooth curve in the spray head according to the exemplary embodiment of the present invention.

FIG. 6 illustrates a process of making a smooth curve in the spray head according to the exemplary embodiment of the present invention.

When the curve is changed to the circle, the plane and the curve are not smoothly connected around the specific point, but the surface is abruptly bent like point #1 of FIG. 6.

In this case, a phenomenon in which the material is significantly hit while flowing may occur. In order to prevent the phenomenon, a circular curve (black) is further extended virtually and a lowermost portion of an extended circle is caused to start from the specific point (point #1) to be smoothly connected with the plane.

When such a surface is obtained, the curve deviates from the distribution of the force of FIG. 3(B) while the curve is lower than a surface profile of FIG. 3(D) and the liquid film thickness is also analyzed to be different.

Figure 7:
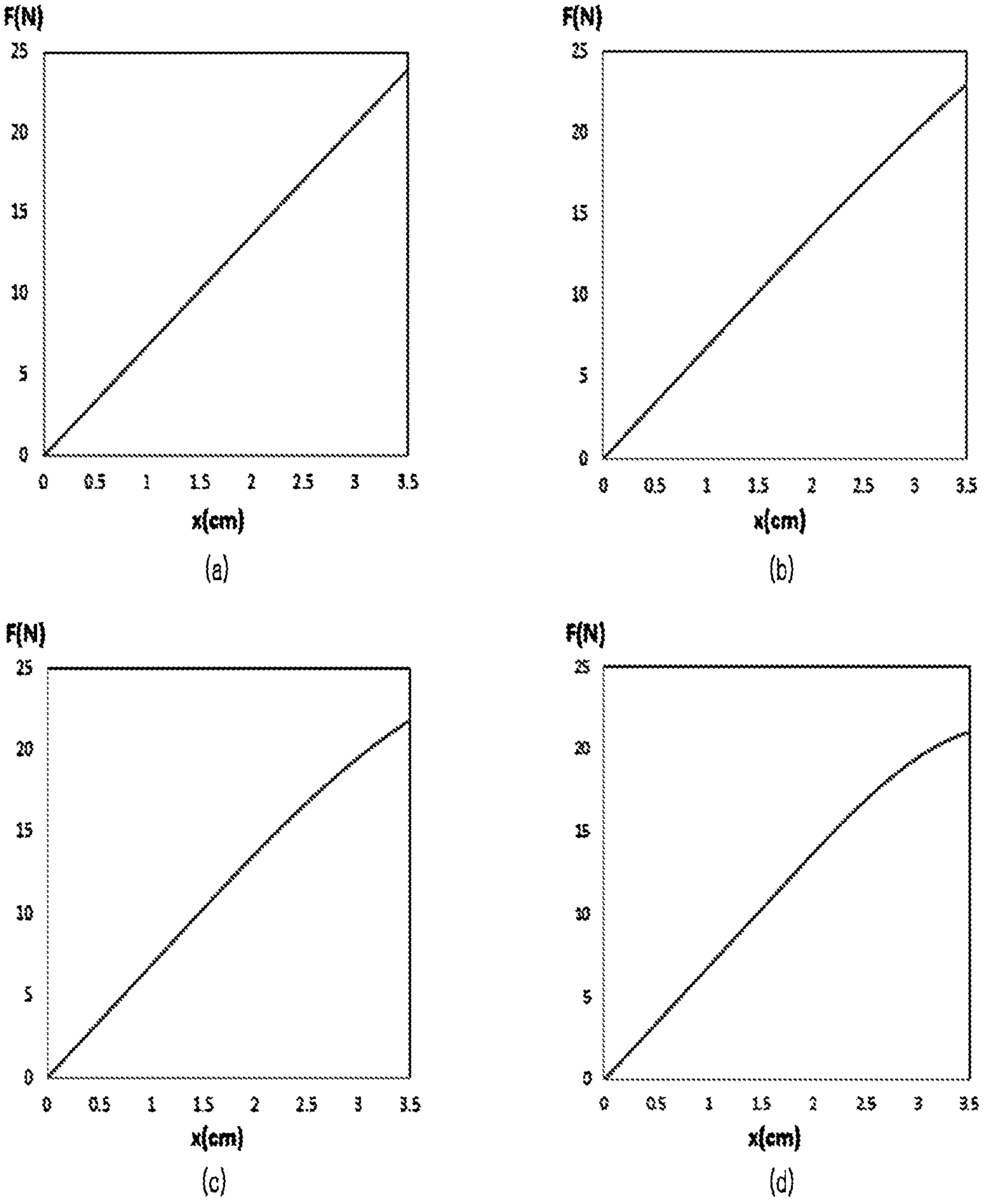
FIG. 7 illustrates force calculated again for each radius of an approximated circle in the spray head according to the exemplary embodiment of the present invention, and illustrates (a) when there is no curve, (b) when a curve starts at 1.0 cm, (c) when the curve starts at 1.5 cm, and (d) when the curve starts at 2.0 cm.

FIG. 7 illustrates force calculated again for each radius of an approximated circle in the spray head according to the exemplary embodiment of the present invention, and illustrates (a) when there is no curve, (b) when a curve starts at 1.0 cm, (c) when the curve starts at 1.5 cm, and (d) when the curve starts at 2.0 cm.

A distribution of force for each radius of the curve considering the smooth plane is illustrated in FIG. 7. The same slope as a case in which there is no curve is shown before the curve starts, but an aspect of the graph is gradually distributed in a form of the curve from the specific point where the curve starts.

It may seen that as the portion where the curve starts is estranged from the original point, the curve of the end is shown more distinctly and the force at the end point is gradually decreased. It can be seen that the distribution of the force to be priorly constantly maintained is scattered while making the smooth surface through FIG. 7.

Figure 8:
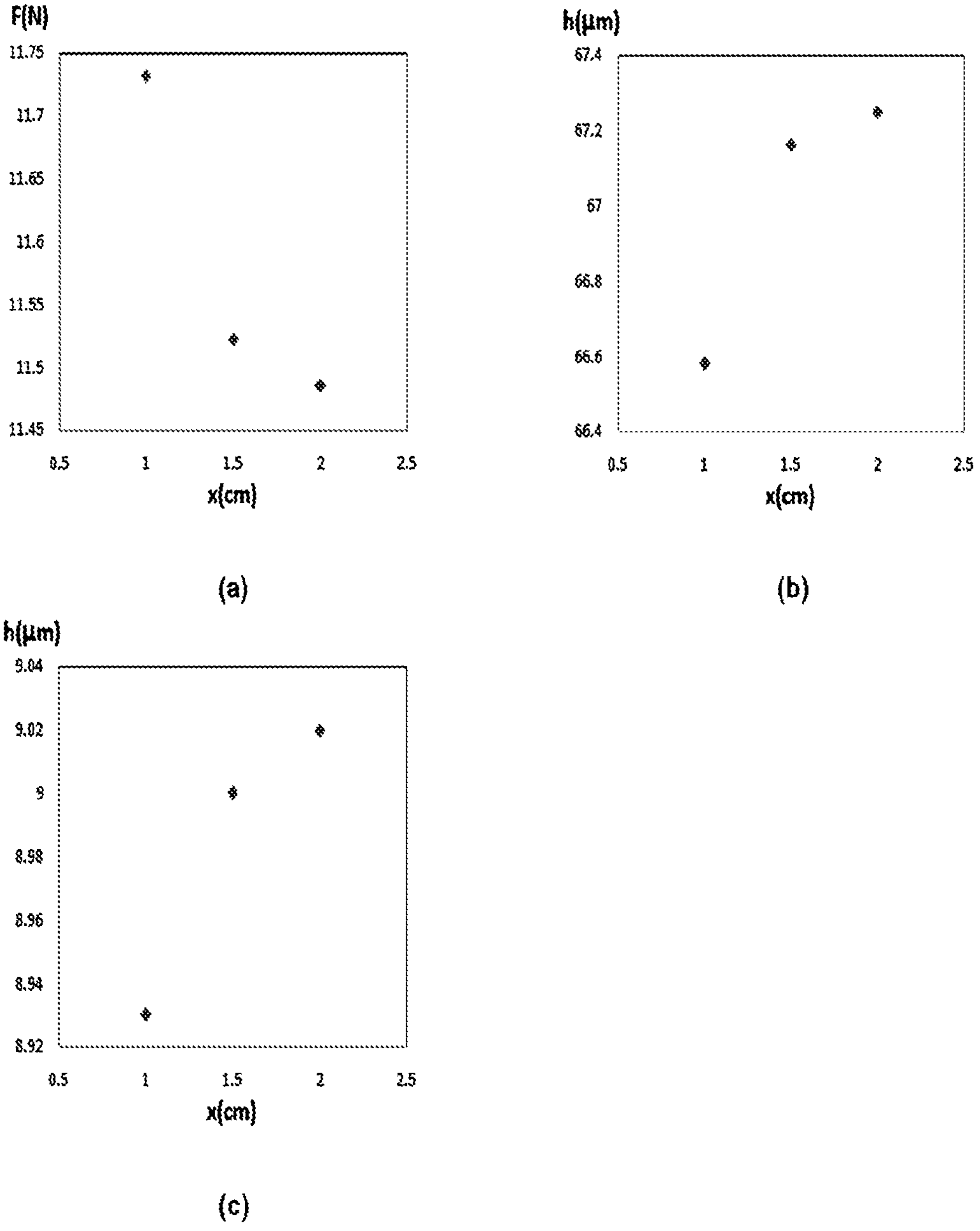
FIG. 8 illustrates (a) final average force (1 to 2 cm), (b) a final film thickness, and (c) a film thickness when water is used as the liquid in the spray head according to the exemplary embodiment of the present invention.

FIG. 8 illustrates (a) final average force (1 to 2 cm), (b) a final film thickness, and (c) a film thickness when water is used as the liquid in the spray head according to the exemplary embodiment of the present invention.

A case in which the distribution of the force which was constant is scattered, and as a result, it is difficult to analyze the film thickness that acts under constant acceleration by the Couette flow is illustrated in FIG. 8(A) by acquiring average force of each of force distributions in FIG. 7.

It can be seen that although the curve start is changed while showing average force for the interval of 1 to 2 cm, the average force applied to the liquid is not significantly changed. Since the average force is almost similar, a final film thickness is not also changed as illustrated in FIG. 8(B). The thickness of water which is aqueous paint shows an almost similar final film thickness as illustrated in FIG. 8(C).

Consequently, surface modeling considering revolution per minute (RPM), an angle of an injection surface, and surface affinity of the spray head is performed.

In the case of the flow of the particle that follows the surface equation acquired by the dynamical analysis, the particle flows along the surface while receiving the same force as the force at the point where the curve is started and accelerated. The flow that flows on the surface while receiving constant acceleration is analyzed as the Couette flow to acquire the velocity distribution and particle atomization is shown by the thickness of the thin film discharged last.

It is difficult to actually prepare theoretical design equation such as the surface equation in a design drawing and actually implement processing of the NC machine, and as a result, the curve is simplified to a circle proximate to the curve to be applied to the processing. Then, a point where a boundary is generated on the plane and the curve is made to be smooth and thereafter, the force distribution is calculated with respect to the surface again.

While calculating the thickness of the film by the resulting average force, a final design of the spray head is completed. A conclusion is that at any predetermined point appropriately separated from the original point, a film thickness associated with the particle atomization to determine the performance of the spray head is almost similar, and the viscosity and the density of the liquid remarkably vary when an appropriate curvature is given.

Figure 9:
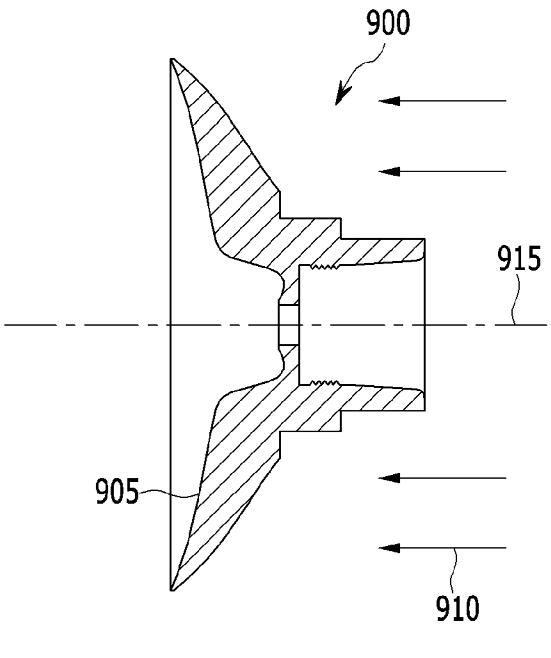
FIG. 9 is a cross-sectional view of a spray head according to the exemplary embodiment of the present invention.

FIG. 9 is a cross-sectional view of a spray head according to the exemplary embodiment of the present invention.

Referring to FIG. 9, the spray head 900 has a supply hole for supplying liquid paint at the center thereof. In addition, the spray head 900 has a structure in which the spray head 900 rotates at a set velocity around a rotary center axis of the center.

The liquid paint is characterized in that the liquid paint is injected in a radial direction while moving from the center toward the edge of a front surface of the spray head 900 by the rotation of the spray head 900.

In the exemplary embodiment of the present invention, an effect to improve total durability and uniformly inject the liquid paint by optimizing the shape of the front surface of the spray head 900 is achieved.

In the exemplary embodiment of the present invention, a product of the painting spray head 900 requires an injection ability having droplet atomization of a predetermined degree or less.

A liquid film thickness above a front surface 905, a shape of a sawtooth (902 of FIG. 10) at the edge, and shaping air 910 complexly act on atomization performance of the head 900. In the exemplary embodiment of the present invention, the spray head 900 has an atomization level having a droplet size which is ½ or ⅓ times larger than the liquid film thickness by the action of the shape of the sawtooth 920 and the shaping air 910, and when the atomization level is proportionally converted, the height h of painting liquid on the front surface 905 may be acquired.

Figure 10:
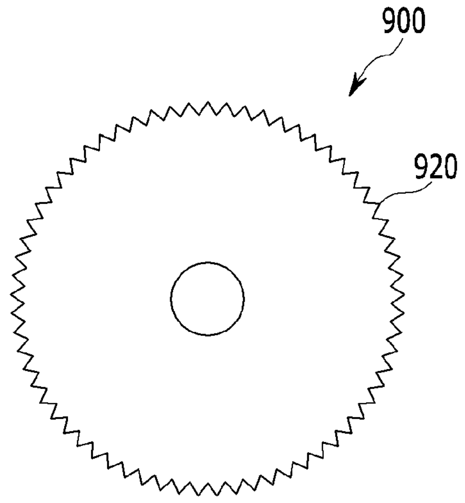
FIG. 10 is a front view of a painting spray head according to an exemplary embodiment of the present invention.

FIG. 10 is a front view of a painting spray head according to an exemplary embodiment of the present invention.

Referring to FIG. 10, for example, when the sawtooth 920 and the shaping air 910 act on the atomization ½ times and 30 μm is required as a droplet size adsorbed in a painted surface, the height h of painting liquid that flows along the front surface of the head may satisfy 60 μm.

Accordingly, an F value equivalent to the height h of the painting liquid is calculated in FIG. 5(A) and thereafter, a radius R is set according to the F value in FIG. 5(B) and since the radius R is formed by a surface function y, x0 which is a point where the curve starts is selected through FIG. 5(C).

A method for calculating the shape of the painting spray head according to the present invention, which injects liquid paint supplied to the center in a radial direction while rotating, may include selecting a radial distance x from the center of the spray head, selecting a distance x0 where a slope surface starts at the radial distance from the center of the spray head, and setting a front form of the spray head through a predetermined equation described below.

$$(0 < x_0 \le 1)\ y = \frac{x\sqrt{1-\left(\frac{x_0}{x}\right)^2}\left[x\sqrt{x^2-x_0^2} - x_0^2\left\{\ln\left(x+\sqrt{x^2-x_0^2}\right)\right\}\right]}{2x_0\sqrt{x^2-x_0^2}}$$

$$(x_0 > 1)\ y' = y + |y(x_0)|$$

The method may include selecting the thickness h of a liquid film on the surface of the spray head, selecting a flow rate q of the painting liquid, selecting material characteristics (μ (N*s/M2) and ρ (km/m2)) of the painting liquid, and calculating a position of an inflection point where the slope surface starts through an equation described below by using the selected characteristics.

$$h = \sqrt[3]{\frac{3q\mu}{\rho ab}}$$

Where, $$a = -\frac{\mu}{\rho}\left(\frac{\partial^2 u}{\partial y^2}\right)$$

and b=2πx.

A painting system according to an exemplary embodiment of the present invention may include a control unit which performs the method for calculating the shape of the painting spray head and the painting spray head.

The control unit may be implemented by one or more microprocessors that operate by a set program and the set program may include a series of commands for performing the method according to the exemplary embodiment of the present invention.

Figure 11:
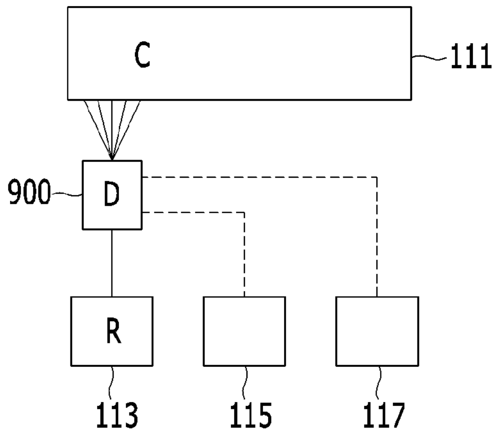
FIG. 11 is a schematic configuration diagram illustrating a painting system including a painting spray head according to an exemplary embodiment of the present invention.

FIG. 11 is a schematic configuration diagram illustrating a painting system including a painting spray head according to an exemplary embodiment of the present invention.

Referring to FIG. 11, the painting system includes a vehicle 111, a painting spray head 900, a moving unit 113, a compressed air supplying unit 115, and a paint liquid supplying unit 117.

The painting liquid supplying unit 117 supplies painting liquid of a predetermined amount to the spray head 900, the compressed air supplying unit 115 supplies compressed air at set pressure to the spray head 900, and the spray head 900 injects the painting liquid on the surface of a vehicle body through the painting liquid and the compressed air supplied while rotating at a predetermined rotational velocity.

Moreover, the moving unit 113 moves the spray head 900 along a route set along the surface of the vehicle body of the vehicle 111 to evenly coat the surface of the vehicle body with the injected painting liquid. A control unit (not illustrated) controls the elements according to a set program.

Figure 12:
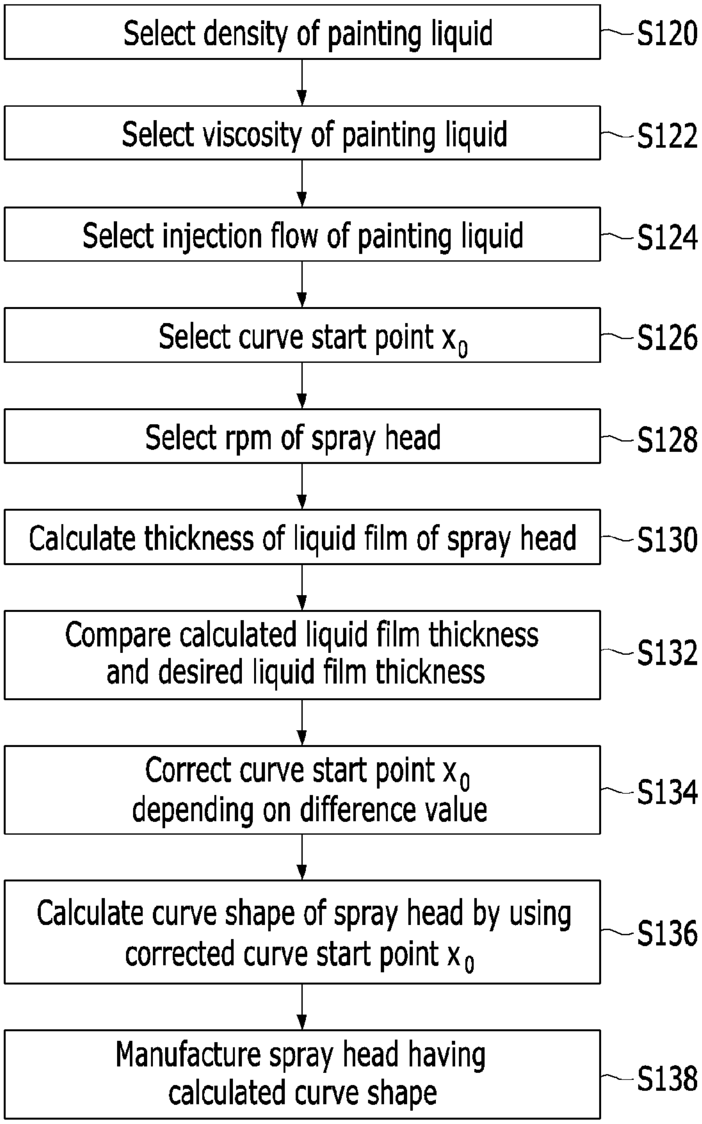
FIG. 12 is a flowchart illustrating a sequence for manufacturing a painting spray head according to an exemplary embodiment of the present invention.

FIG. 12 is a flowchart illustrating a sequence for manufacturing a painting spray head according to an exemplary embodiment of the present invention.

Referring to FIG. 12, a method for manufacturing a painting spray head includes selecting the density of a painting liquid (S120), selecting the viscosity of the painting liquid (S122), selecting an injection flow rate of the painting liquid (S124), selecting a curve start point on a curve of a spray head 900 (S126), selecting an RPM of the spray head 900 (S128), calculating the thickness of a liquid film injected from the spray head 900 (S130), comparing the calculated liquid film thickness and a desired liquid film thickness (S132), correcting the curve start point according to a difference therebetween (S134), calculating a curve shape of the spray head 900 by using the corrected curve start point (S136), and actually manufacturing the spray head 900 according to the calculated shape (S138).

A method for manufacturing a painting spray head may be performed by a predetermined program and the program may be executed by a system having a processing ability such as a computer. Moreover, a cutting tool or a separate mold may be used depending on a form of the spray head calculated by the program or system.

In the exemplary embodiment, density and viscosity are considered as a property of painting liquid in S120 and S122, but a different property may be selectively used.

Figure 13:
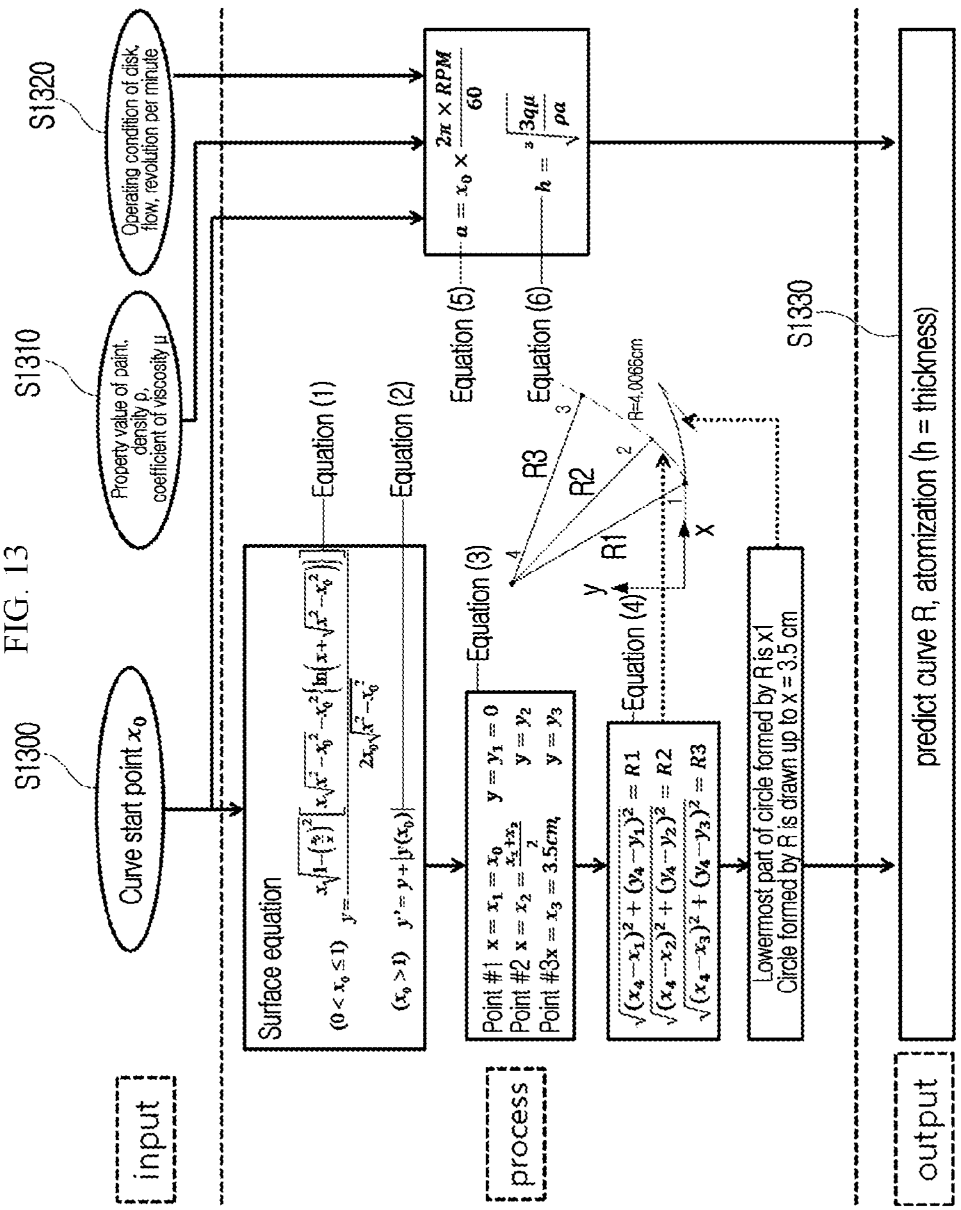
FIG. 13 is a schematic flowchart illustrating a process of a program for manufacturing a painting spray head according to an exemplary embodiment of the present invention.

FIG. 13 is a schematic flowchart illustrating a process of a program for manufacturing a painting spray head according to an exemplary embodiment of the present invention.

Referring to FIG. 13, a virtual curve start point is input in step S1300, a property value such as density or a coefficient of viscosity of the painting liquid (paint) is input in step S1310, and a flow rate and an RPM are input as an operating condition of the spray head (disk) 900 in step S1320.

A height of the paint that is injected is calculated by the curve start point, the paint property value, and the operating condition of the disk which are virtually input through Equations 5 and 6.

Herein, the calculated height of the paint and a height desired by a designer are compared to correct the curve start point.

The shape of the curve of the spray head 900 is set through the corrected curve start point by using Equations 1, 2, 3, and 4 and a value of a radius R depending on the position of the curve and predicted atomization, that is, the height of injected paint are calculated as output values in step S1330.

Figure 14:
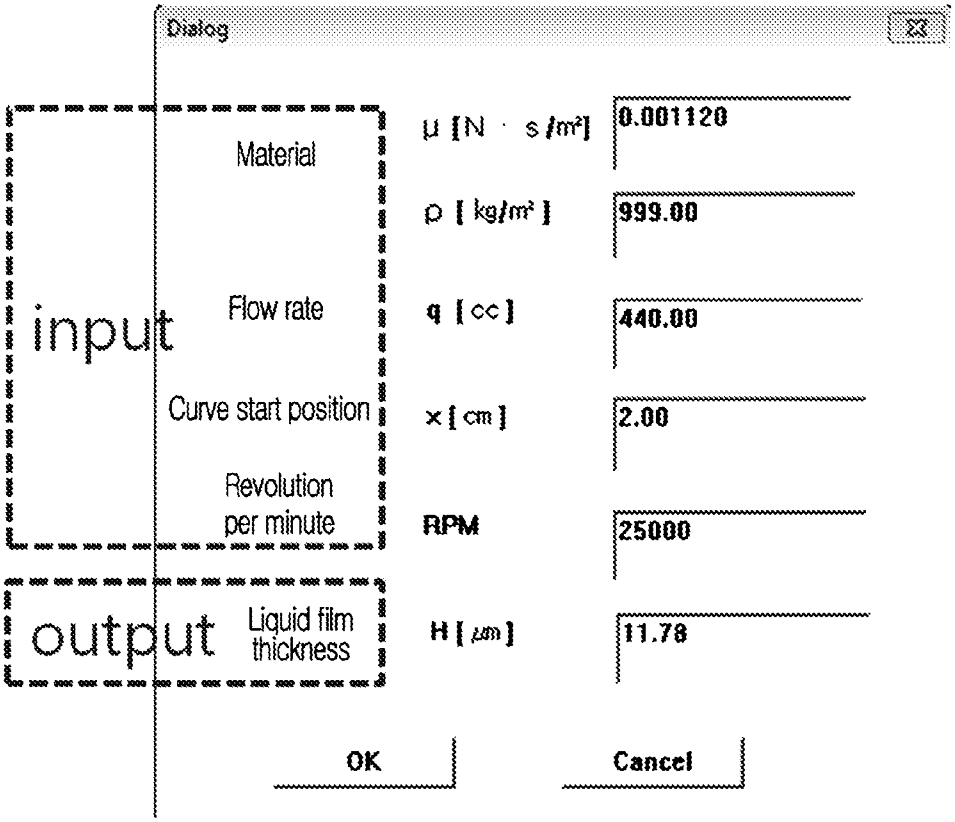
FIG. 14 illustrates an input screen of a program for manufacturing a painting spray head according to an exemplary embodiment of the present invention.
Figure 15:
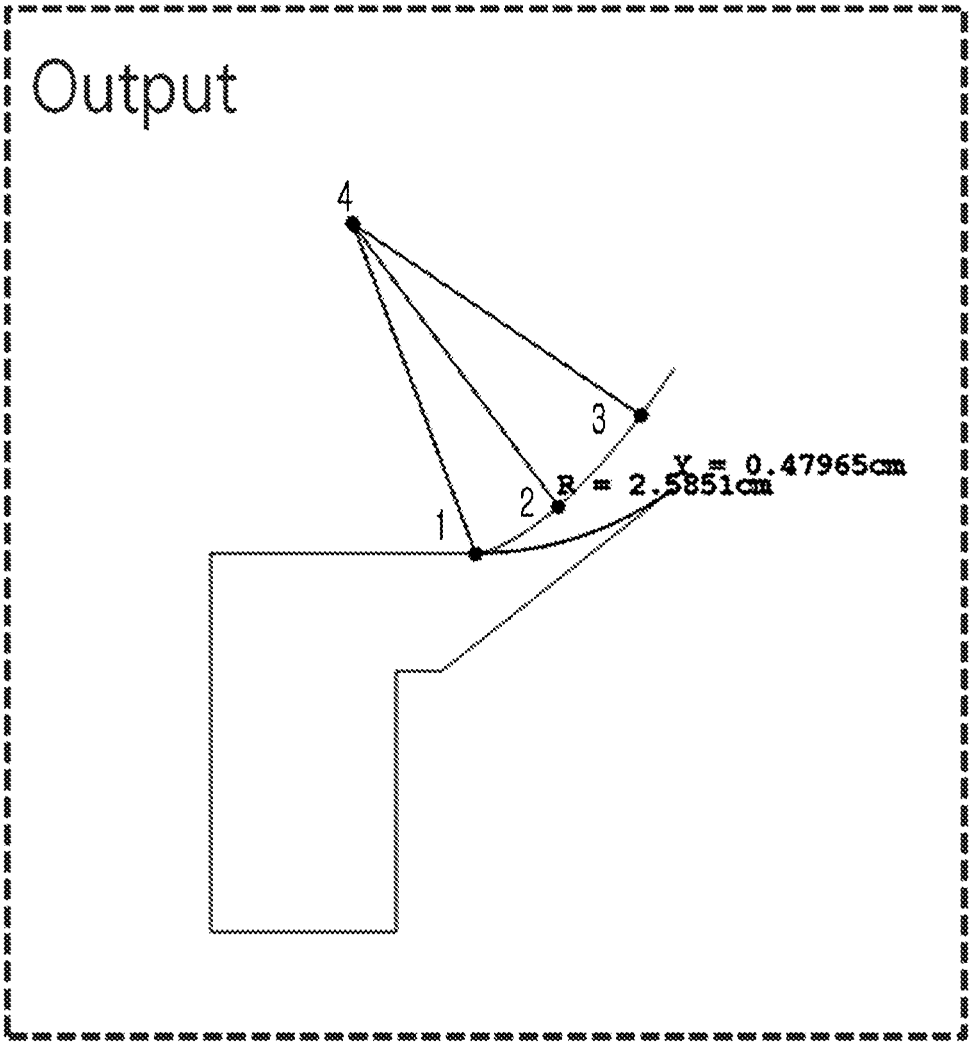
FIG. 15 illustrates an execution result of a program for manufacturing a painting spray head according to an exemplary embodiment of the present invention.

FIG. 14 illustrates an input screen of a program for manufacturing a painting spray head according to an exemplary embodiment of the present invention. FIG. 15 illustrates an execution result of a program for manufacturing a painting spray head according to an exemplary embodiment of the present invention. An input numerical value is expressed by the screen of FIG. 14 and a calculated result is expressed by a screen of FIG. 15.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for calculating a shape of a painting spray head that injects liquid paint supplied to the center in a radial direction while rotating, the method comprising:
- inputting a material characteristic of painting liquid to be injected;
- selecting a start point where a curve starts on a front surface of the painting spray head;
- calculating the thickness of a liquid film injected from the painting spray head through an input numerical value;
- correcting the start point where the curve starts depending on a difference value between the calculated thickness of the liquid film and a required thickness of the liquid film;
- calculating a curve shape of the painting spray head by using the corrected start point; and
- manufacturing the painting spray head based on the calculated curve shape.

2. The method of claim 1, further comprising:
inputting an rpm of the painting spray head.

3. The method of claim 2, wherein:
the material characteristic includes density and viscosity.

4. The method of claim 3, further comprising:
selecting an injection flow rate of the painting liquid.

5. The method of claim 4, wherein:
the start point is a linear distance measured toward an edge from the center of the painting spray head.

6. A painting system comprising:
a painting spray head which is manufactured by a method for calculating a shape of the painting spray head comprising:
- inputting a material characteristic of painting liquid to be injected;
- selecting a start point where a curve starts on a front surface of the painting spray head;
- calculating the thickness of a liquid film injected from the painting spray head through an input numerical value;
- correcting the start point where the curve starts depending on a difference value between the calculated thickness of the liquid film and a required thickness of the liquid film; and
- calculating a curve shape of the painting spray head by using the corrected start point.

7. The painting system of claim 6, further comprising:
a painting liquid supplying unit which supplies painting liquid to the spray head;

a compressed air supplying unit which supplies compressed air to the spray head to inject the painting liquid together with the compressed air; and a moving unit which moves the painting spray head along a set route of a set space.

* * * * *